United States Patent [19]

Fischer et al.

[11] Patent Number: 4,856,947
[45] Date of Patent: Aug. 15, 1989

[54] CUTTING CURVED MOLD SURFACES

[75] Inventors: Horst Fischer, Osnabrueck; Werner Wichmann, Muenster; Gernot Wilhelms; Guenter Wiltmann, both of Osnabrueck, all of Fed. Rep. of Germany

[73] Assignee: Kabel-und Metallwerke AG, Osnabrueck, Fed. Rep. of Germany

[21] Appl. No.: 165,578

[22] Filed: Mar. 8, 1988

[30] Foreign Application Priority Data

Mar. 13, 1987 [DE] Fed. Rep. of Germany ....... 3708150

[51] Int. Cl.⁴ .................... B23C 1/16; B43L 13/10
[52] U.S. Cl. .................................. 409/119; 33/23.11; 409/130
[58] Field of Search .............. 409/115, 118, 119, 120, 409/125, 130, 95; 33/19.1, 19.2, 21.1, 23.11; 51/100 R, 101 LG, 105 LG, 106 LG, 272; 144/144 R, 144.5 R, 137, 372

[56] References Cited

U.S. PATENT DOCUMENTS

| | | | |
|---|---|---|---|
| 1,956,505 | 4/1934 | Horner | 33/23.11 |
| 2,334,231 | 11/1943 | Wallace | 409/118 |
| 2,669,908 | 2/1954 | Buechler | 409/118 |
| 2,784,649 | 3/1957 | Zelewsky | 409/119 |
| 2,800,838 | 7/1957 | Johnson | 33/23.11 |
| 3,094,898 | 6/1963 | Fuchs, Jr. | 409/130 |
| 3,437,007 | 4/1969 | Schmermund | 409/118 |
| 3,748,964 | 7/1973 | Whitney | 409/118 |
| 4,219,933 | 9/1980 | Kita et al. | 33/21.1 |

FOREIGN PATENT DOCUMENTS

| | | | |
|---|---|---|---|
| 149734 | 7/1985 | European Pat. Off. . | |
| 2544604 | 4/1977 | Fed. Rep. of Germany | 409/118 |
| 2800525 | 7/1978 | Fed. Rep. of Germany | 409/118 |
| 433970 | 12/1974 | U.S.S.R. | 409/130 |

*Primary Examiner*—William Briggs
*Attorney, Agent, or Firm*—Ralf H. Siegemund

[57] ABSTRACT

Milling and cutting of curved mold surfaces is controlled by templates, each defining a cam surface to be scanned; one of the templates is pivoted by lateral shift operation of a second template, there being a linkage interposed.

8 Claims, 1 Drawing Sheet

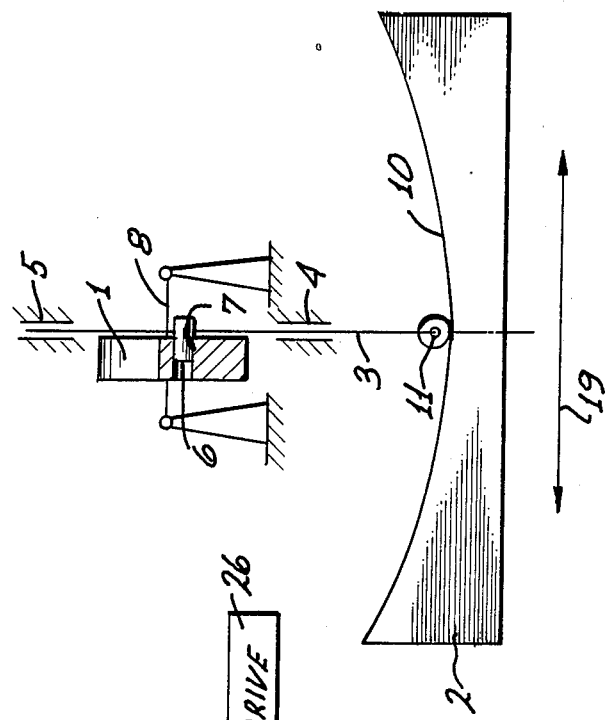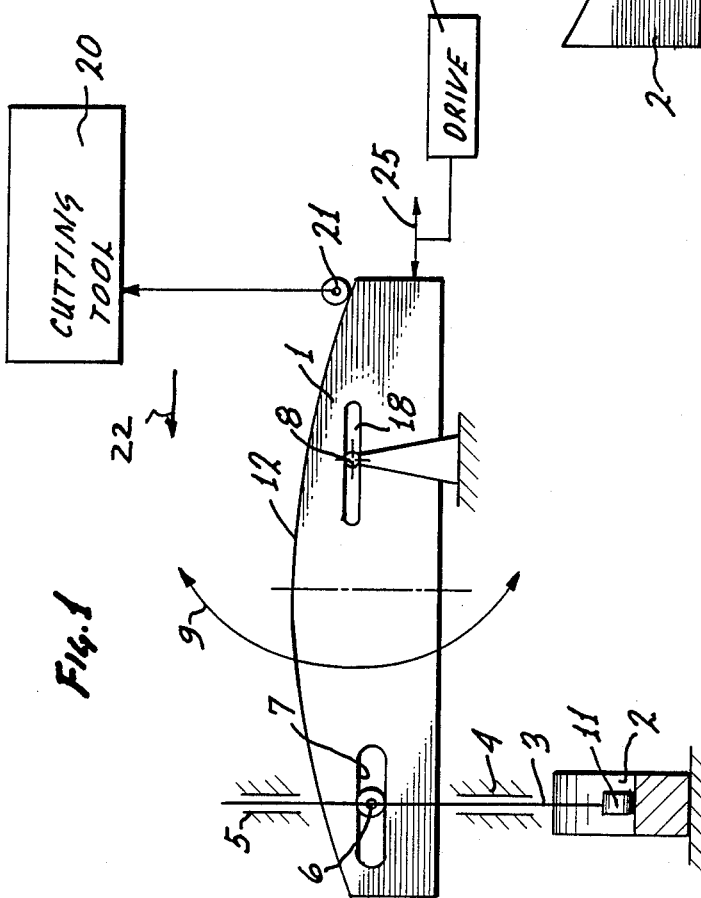

CUTTING CURVED MOLD SURFACES

BACKGROUND OF THE INVENTION

The present invention relates to the cutting, milling and similar kinds of shaping of curved surfaces, particularly plate to be used in molds for casting, under utilization of certain predetermined control parts for the cutting tool, using e.g. curved tracking on the basis of suitable templates.

Devices and methods of the kind to which the invention pertains are fairly well known. Exemplary here are for example German printed patent applications Nos. 28 00 525 and 25 44 604. The devices disclosed therein are fairly sophisticated, particularly as far as multiple curved surfaces of large extension are concerned. This is needed e.g. for molds for continuous casting, particularly the broad plates of molds for the casting of slab ingots. This type of molds are constructed generally from individual plates made of copper and one distinguishes longitudinal or wide plates from short or transverse plates, four in total and being arranged in a box-like configuration, the "box" being open in the top and the bottom. The molten metal is poured into the mold from above and since the mold is strongly cooled to solidified shell or skin forms in the mold and emerges as a casting ingot from the bottom. The interior of the casting is still liquidous at this point but that liquidous core will solidify at some point downstream from the mold.

Molds for slab ingots are usually constructed to have a certain curvature at a relatively large radius (6 to 15 m) casting is basically and usually carried out vertically owing to the utilization of the force of gravity but the continuousness requires that the casting is veered into the horizontal. The curvature of the mold does match the curvature of that veering path. The mold wall plates have to be shaped i.e. curved accordingly.

The operator in a general sense usually requires casting to be very accurate simply because the customer in turn requires certain qualities in the product. This means that the continuous casting mode and the machiens generally have to meet certain standards and requirements which include particularly an accurate construction of the mold plate. Such requirement is of course imposed upon the maker of the mold. In particular it is necessary to make the mold through cutting operation and milling or the like such that the plates are accurate in terms of predetermined dimensions with emphasis on reproducibility of results. This way it will be possible to satisfy strict requirements of accuracy in the continuous casting process.

The known structures were indeed able to fulfill many requirements. However difficulties arise when the mold is, in addition, having a certain funnel configuration i.e. if it is supposed to narrow or taper down, in the direction of casting. This tapering is shown e.g. in European Pat. No. 149734. A funnel shaped entrance is provided through appropriate configuration of the mold plates. Narrow sides of the mold taper and owing to the funnel shape the additional requirement exists that the content of the mold is moved and flushed through, particularly the molten material is to be uniformly distributed. On the other hand the further requirement exists that as far as mold construction and operation is concerned, the formation of longitudinal fractures and other perforation must be avoided; rupture of the skin might have catastrophic results. Thus, the funnel shaped enlargement of the upper mold part must not pose problems in this regard.

The cutting of the mold plates generally and the cutting process as far as adaptation to the funnel shaped requirement is concerned poses certain problems. These problems are compounded if the mold is to be curved, i.e. a curvature is to be superimposed upon the taper. Moreover, the curvature is conceivably not in one but two dimensions. Additionally geometric matching is required throughout. This matching includes the funnel shape requirement, which as already stated compounds the complexity of the mold surface to be made. Hence not just the mold but also the upper portion into which the molten metal is poured, should have a funnel shape with matched curvature.

In the past these specific details and requirements turned into a requirement of manual labor. A mold and mold plates which exhibit the desired funnel shaped entrance under observance of the curvature at the desired accuracy required very much the accuracy of a skilled artisan.

DESCRIPTION OF THE INVENTION

It is an object of the present invention to provide a new and improved method and equipment for making a curved surface, possibly with specific transition zones, for the purpose of providing a particular geometry to a mold plate.

In accordance with the preferred embodiment of the present invention, it is suggested to provide a template representing a mold surface contour to be made which template is pivotally mounted for turning on a particular point. This way the cutting tool or tools, depending on size and dimensions permits follow-up motion along a very large variety of different surface curvatures. Specifically, gapless working of a funnel shaped part over a large area with multiple surface curvature is possible in a reproducible fashion without manual intervention.

In furtherance of the invention it is suggested to provide a further template cooperating with the first one in that the further or second template determines magnitude and/or direction of pivoting the first template. Thus this feature goes beyond exact shaping of the surface toward automation of the process thereby reducing the necessity for manual intervention further. The further template may or may not be pivotable; is has a specific cam surface and contour. The pivotable template may in addition be shiftable as to its pivot points.

In the case of fairly complex curves it may be required to include and superimpose further components of movement upon the principal templates with additional and supplemental templates being provided in a kind of hierarchical structure. This way one does not only obtain the pivoting of the primary template but moving of it along a prescribed path.

The basic aspects of the invention as described above are of immediate significance for two dimensional consideration but can be expanded to include three dimensions. The pivot point of the primary template may be subject to control repositioning.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a schematic side view for practicing the invention in accordance with the preferred embodiment under observation of the best mode principle; and FIG. 2 is a view of the device of FIG. 1 shown from the left side thereof.

Proceeding to the detailed description of the drawings the figures show templates 1 and 2 wherein the template 1 of FIG. 1 has a particular convex surface delineation 12 and FIG. 2 shows a concave surface 10 of template 2. These contours are of course task determined. The principal aspect is that the contour (12) of template 1 is, so to speak, the prime determination for the position of a cutting tool 20. The template 2, via a linkage 3, controls the pivoting of template 1 and thus provides for a secondary variant in the position control for the tool 20. Arrow 22 denotes representatively the progression of the tool during cutting and relative to the object being cut and concurrently, the feeler 21 moves over the surface 12. The two templates can thus be understood to be operationally linked so as to form a composite template delineating and being a representation of plural multivariant surfaces, the plurality resulting from different pivot positions of template 1. Hence FIGS. 1 and 2 are views of the same device and template 2 is visible in FIG. 1 while template 1 is also visible in FIG. 2.

The linkage 3 is provided and arranged transversely to the various templates and is mounted and guided in mounts and bearings 4 and 5. Template 1 is provided with an oblong slot or groove 7 penetrated by a pin 6 which in turn is a part of the linkage 3. The particular template 1 is pivotably mounted in a journal point 8. Reference numeral 9 denotes the pivot range. Assuming that template 1 remains stationary then curvature 12 determines exclusively the position of a scanning wheel 21 pertaining to and controlling the position of a cutting tool 20. In view of the following features, two sets of families of control curves are set up as follows.

A scanning wheel 11 runs on the concave contour 10 of the template 2 and depending on the motion of the template 2 as indicated by the double arrow 19, the linkage 3 is lifted. FIG. 2 illustrates the lowest possible position for the linkages 3. Lifting obtains when the template 2 is moved out of the illustrated position, and in either direction of the plane of the drawing of FIG. 2. Pin 6 will be displaced as scanning wheel 11 and linkage 3 is lifted or lowered. As a consequence, template 1 is lifted and lowered, i.e. pivoted as indicated by arrow 9.

It can thus be seen that template 2 controls the position of template 1 and the contour 12 of template 1 in turn is provided for controlling the movement of the tool The curvature 12 of that surface is a first parameter by means of which the tool is moved but owing to the pivotal displacement of the template 1 in accordance with arrow 9 by operation of lifting and lowering linkage 3 in accordance with the curve 12 the effective curvature for control of a machine tool for cutting a mold is varied in accordance with a second parameter that establishes a first family of control curves.

The pivot shaft 8 for template 1 is actually mounted in an oblong slot 18 which permits adjustment of the location of the pivot point for the template 1 in relation to the particular curvature of the surface 12. A drive 26 moves the template 1 as indicated by the double arrow 25 such that the pivot point is changed vis-a-vis the surface 12. This may obtain during operation in an automated fashion. The cutting tool 20 is thus subjected to a three-fold composite movement. Two have been described and the third component is the shift in the pivot point on account of the drive 26 which sets up a second family of composite curves for each point position of template 1.

The curvatures are of course by way of example only and can vary. They will vary if indeed a different kind of surface is to worked and prepared. The linkage between the secondary template 2 and the primary template 1 is simply one with immediate and direct transmission of the geometric parameter owing to the curvature 10. The force moving the template 2 is used additionally for physically operating the template 1. This mechanical linkage is a simple one and suffices in many cases but in other instances it may be required to use strong forces, electromagnetic or pneumatic or hydraulic linkage may then be provided for. This depends on the force requirements, the degree of accuracy and so forth.

Simple mechanical feeling device is provided for scanning the curvatures 10 of surfaces 12 of the templates 2. Instead one may have an optical or electrooptical scanning facility available for that purpose. This is a matter of the required accuracy. The same holds true with regard to the scanning of the surface 12.

The invention is not limited to the embodiments described above but all changes and modifications thereof, not constituting departures from the spirit and scope of the invention, are intended to be included.

We claim:

1. Apparatus for controlling milling or cutting of curved surfaces particularly of mjold plates under utilization of a first template, defining a cam surface to be scanned for operating said tool, the improvement comprising:

means for pivotably mounting said first template;

a second template in engagement with said first template for causing said first template to pivot; and additional means for moving said second template to tehreby move the first template in relation to the center of the second template so that said first template is pivoted on moving of said second template.

2. Apparatus for controlling milling or cutting of curved surfaces particularly of mold plates under utilization of a first template, defining a cam surface to be scanned for operating said tool, the improvement comprising:

a pivot mount for pivotably mounting said first template;

a second template in engagement with said first template for causing said first template to pivot; and means for varying the pivot mount of the first template, as to its location to thereby vary magnitude or direction or both on pivoting.

3. Apparatus as in claim 1 wherein linkage means are provided for causing pivoting of the first template, the linkage being a direct one so that physical displacement obtained by the second template is directly and immediately translated into a pivot motion at the point of engagement of the linkage with the second means.

4. Apparatus as in claim 1, said second template being provided with a concave surface for engagement with the linkage.

5. Device as in claim 4, the linkage being a lifting and lowering rod.

6. Apparatus for controlling milling or cutting or curved surfaces of mold plates, the improvement comprising:
 a first template having a curved surface;
 means for scanning the surface and for operating a tool;
 means for pivotaly mounting said first template there being a pivot accordingly;
 a second template; and
 linkage means in engagement with said second template for causing said first template to pivot.

7. Apparatus as in claim 6, including means for shifting the pivot point of the first template.

8. Apparatus as in claim 6, the second template being movable for shifting the linkage means so as to obtain the pivoting of the first template.

* * * * *